(12) United States Patent
Zhu

(10) Patent No.: US 8,626,158 B2
(45) Date of Patent: Jan. 7, 2014

(54) METHOD AND SYSTEM FOR PROVIDING USERS WITH INTELLIGENT SERVICES

(75) Inventor: Dongming Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1794 days.

(21) Appl. No.: 11/599,038

(22) Filed: Nov. 14, 2006

(65) Prior Publication Data

US 2007/0133782 A1 Jun. 14, 2007

Related U.S. Application Data

(63) Continuation of application No. PCT/CN2005/001847, filed on Nov. 4, 2005.

(30) Foreign Application Priority Data

Nov. 8, 2004 (CN) .......................... 2004 1 0094545

(51) Int. Cl.
*H04W 4/00* (2009.01)

(52) U.S. Cl.
USPC .............. 455/433; 455/432.1; 455/432.2; 455/432.3; 455/445; 370/352; 379/201.02; 379/201.12

(58) Field of Classification Search
USPC ........................................................ 455/433
See application file for complete search history.

(56) References Cited

U.S. PATENT DOCUMENTS

| | | | |
|---|---|---|---|
| 6,374,107 B1 | 4/2002 | Boylan et al. | |
| 6,940,847 B1 * | 9/2005 | Glitho et al. | 370/352 |
| 2002/0107038 A1 * | 8/2002 | Berg | 455/466 |
| 2004/0037407 A1 * | 2/2004 | Gourraud et al. | 379/202.01 |
| 2005/0050194 A1 * | 3/2005 | Honeisen et al. | 709/224 |
| 2007/0100981 A1 * | 5/2007 | Adamczyk et al. | 709/223 |

FOREIGN PATENT DOCUMENTS

| | | |
|---|---|---|
| CN | 1406078 A | 3/2003 |
| CN | 1507254 A | 6/2004 |
| CN | 100488220 C | 5/2009 |
| WO | WO 98-36542 | 8/1998 |
| WO | WO 00-78058 | 12/2000 |
| WO | WO 03-032656 | 4/2003 |
| WO | WO 2006-047958 | 5/2006 |

OTHER PUBLICATIONS

Lucent Technologies White Paper, "IP Multimedia Subsystem (IMS) Service Architecture." Jan. 23, 2004. XP-002407116, pp. 1-12.

(Continued)

*Primary Examiner* — Charles Appiah
*Assistant Examiner* — Mazda Sabouri
(74) *Attorney, Agent, or Firm* — Conley Rose, P.C.; Grant Rodolph

(57) ABSTRACT

A method and system for providing a subscriber with an intelligent service provides the subscriber of an IP Multimedia Subsystem (IMS) domain with special intelligent services of multiple intelligent platforms or convergent services. In the present invention an IP Multimedia Service Switching Function (IM-SSF) that supports an intelligent control protocol other than a Customized Application for Mobile network Enhanced Logic (CAMEL) Application Part (CAP) protocol is added into the IMS. The IM-SSF triggers the intelligent services through the protocol other than CAP to a Service Control Function (SCF) of corresponding intelligent platform according to obtained subscription information upon receipt of a session establish request related to a served subscriber; the subscription information can be pre-configured in the IM-SSF, or downloaded by the IM-SSF from a Home Subscriber Server (HSS) of the subscriber.

21 Claims, 5 Drawing Sheets

(56) References Cited

OTHER PUBLICATIONS

European Telecommunications Standards Institute (ETSI), ETSI Standards, "Digital Cellular Telecommunications System (Phase 2+)." Sep. 2004. XP014016511, vol. 3-CN2, No. V560.

Liu, C.Z., et al, "SIP-Based Services Architecture Across Wireless and Wireline Access." 2004. *Bell Labs Technical Journal*, vol. 9, No. 3, pp. 5-13.

Foreign Communication from a Counterpart Application—PCT Application PCT/CN2005/001847, English Translation of Written Opinion, Feb. 6, 2006, 3 pages.

Foreign Communication from a Counterpart Application—European Application 05806955.0, European office action, Jan. 29, 2008, 5 pages.

Foreign Communication from a Counterpart Application—European Application 05806955.0, European office action, May 13, 2009, 6 pages.

Foreign Communication from a Counterpart Application—European Application 05806955.0, European office action, Dec. 10, 2009, 4 pages.

Foreign Communication from a Counterpart Application—Chinese Application 200410094545.X, Office action dated Aug. 8, 2008, 3 pages.

Foreign Communication from a Counterpart Application—Chinese Application 200410094545.X, English translation office action Aug. 8, 2008, 2 pages.

"Intelligent Network Capability Set Two (CS-2)—Intelligent Network Application Protocol (INAP)," YD/T 1226-2002; dated Aug. 23, 2002, 407 pages.

"Intelligent Network Capability Set Two (CS-2)—Intelligent Network Application Protocol (INAP)," English translation YD/T 1226-2002 Sections 10.1-10.5.2; dated Aug. 23, 2002, 17 pages.

"Series Q: Switching and Signalling Intelligent Network—Interface Recommendation for Intelligent Network Capability Set 2: Part 1," ITU-T Recommendation Q.1228—Fascicle 1/5, Sep. 1997.

"Series Q: Switching and Signalling Intelligent Network—Interface Recommendation for Intelligent Network Capability Set 2: Part 2," ITU-T Recommendation Q.1228—Fascicle 2/5, Sep. 1997.

"Series Q: Switching and Signalling Intelligent Network—Interface Recommendation for Intelligent Network Capability Set 2: Part 3," ITU-T Recommendation Q.1228—Fascicle 3/5, Sep. 1997.

"Series Q: Switching and Signalling Intelligent Network—Interface Recommendation for Intelligent Network Capability Set 2: Part 4," ITU-T Recommendation Q.1228—Fascicle 4/5, Sep. 1997.

"Series Q: Switching and Signalling Intelligent Network—Interface Recommendation for Intelligent Network Capability Set 2: Part 5," ITU-T Recommendation Q.1228—Fascicle 5/5, Sep. 1997.

3rd Generation Partnership Project; Technical Specification Group Core Network; Customised Applications for Mobile Network Enhanced Logic (CAMEL, Phase 4—Stage 2 (Release 6), 3GPP TS 23.078, Sep. 2004.

3rd Generation Partnership Project; Technical Specification Group Core Network; Customised Applications for Mobile Network Enhanced Logic (CAMEL, Phase 4—Stage 2 IM CN Interworking (Release 5), 3GPP TS 23.278, Sep. 2004.

\* cited by examiner

METHOD AND SYSTEM FOR PROVIDING USERS WITH INTELLIGENT SERVICES

FIELD OF THE TECHNOLOGY

The present invention relates to the Intelligent Network (IN) service triggering technique, and particularly, to a method for providing subscribers of IP Multimedia Subsystem (IMS) with special intelligent services or convergent services of different intelligent platforms.

BACKGROUND OF THE INVENTION

The concept of IN was brought forward by Bell Communication Inc. and American Technology Corporation in 1984 and standardized by Consultative Committee for International Telephone and Telegraphy (CCITT) in 1992. It is a system that is able to generate and implement various new services in a fast, convenient, flexible, inexpensive and effective way. The objective of the IN is to serve all types of communication networks, including existed fixed communication networks such as a Public Switched Telephone Network (PSTN) and an Integrated Services Digital Network (ISDN) as well as mobile communication networks such as a Global System for Mobile Communication (GSM), a Wideband Code Division Multiple Access (WCDMA) system, a north America Code Division Multiple Access (CDMA) system and a CDMA2000 system.

Along with the development of communication networks, users' requirements to services keep rising. The objective of the IN is to provide users with new services in a fast, convenient and inexpensive way. To achieve the objective, a characteristic in design of the IN is to separate service handling process from call handling process.

In a network without an IN, every supplementary service for users is implemented through adding corresponding software and hardware in every network node. Therefore, exchangers in the network need to be upgraded accordingly to add or to modify a service.

But in a network with an IN, exchanger acts as a Service Switching Function (SSF), which is just responsible for basic switching functions, while all the intelligent services are handled by another network layer, which is the intelligent network. The SSF in the TN is used for switching. It reports various events in a call to a Service Control Function (SCF) and can hang up the call, waiting for further instructions from the SCF. The SCF accomplishes a service logic control.

The system structure of an IN is illustrated in FIG. 1. It should be noted that in a fixed IN in the prior art, the protocol adopted in the interface between a Service Control Point (SCP) and a Service Switching Point (SSP), as well as in the interface between the SCP and an Intelligence Peripheral (IP) is IN Application Protocol (INAP), which is defined by International Telecommunication Union Telecommunication Standardization Sector (ITU-T).

In order to implement intelligent services in the GSM/WCDMA system, Customized Application for Mobile network Enhanced Logic (CAMEL) is introduced. To support CAMEL services, three entities named as gsmSCF, gsmSSF and gsmSRF are added into the GSM/WCDMA system besides the existing Home Location Register (HLR), Visitor Location Register (VLR), Mobile Switching Center (MSC) and Gateway Mobile Switching Centre (GMSC). The gsmSSF is used for receiving instructions from the gsmSCF and reporting information of call status to the gsmSCF; the gsmSCF is the core of the mobile IN, which is used for executing CAMEL service logic, controlling call switching and charging etc; the gsmSRF is used for providing dedicated resources for services such as playing announcement and collecting user information The functional architecture of a circuit switched domain that supports CAMEL in a WCDMA network is illustrated in FIG. 2A. It should be noted that the CAMEL service is implemented through the collaboration of a CAMEL Application Part (CAP) and a Mobile Application Part (MAP). The CAP protocol is used for the interaction among the gsmSCF, the gsmSSF and the gsmSRF. The CAP protocol is defined based on the INAP, while the capability set it supported in CAMEL Phase 1 to Phase 3 is a subset of IN Capability Set 2 (IN CS2) with special parameters or messages for mobile communication. In CAMEL Phase 4, the definition of Call Party Handling (CPH) capability is introduced, and the call model is developed to be consistent with that of IN CS2. And as the mobile application part, the MAP protocol is still used for supporting mobility-related features for users.

The CDMA mobile communication system in north America adopts American National Standard Institute (ANSI) 41D protocol. Similarly, in order to support the IN services, a series of Wireless IN (WIN) protocols were defined by stages on the base of the signaling structure and signaling flow in the ANSI 41D protocol by the Telecommunications Industry Association/Electronics Industry Association (TIA/EIA) of ANSI according to the IN CS2. Where, IS771 protocol was put forward in WIN Phase I, it defines technical requirements for WIN and provides services including a Calling Name Presentation (CNAP), a Voice Controlled Services (VCS) and an Incoming Call Screening (ICS); IS826 protocol was put forward in WIN Phase II, it provides WIN capability for Pre-Paid Charging (PPC); and IS848 protocol which is related to WIN Phase II was put forward in WIN Phase III, it mainly defines the services including a Rejection of Undesired Annoying Calls (RUAC), a Premium Rate Charging (PRC), a Freephone Service (FPH) and an Advice Of Charging (AOC). All the above protocols are finally integrated into ANSI 41E Protocol, which makes the ANSI 41E Protocol be a core network protocol totally based on the IN.

Both the CDMA ANSI-41 wireless IN and the GSM/WCDMA CAMEL mobile IN are derived from the fixed IN, therefore their system architectures are basically identical to that of the fixed IN: the intelligent layer is separated from the switching layer; service control is accomplished by the intelligent layer; the network includes the SSP (named as the gsmSSF in CAMEL architecture), the SCP (named as the gsmSCF in CAMEL architecture), the IP (named as the gsmSRF in CAMEL architecture), a Service Management System (SMS), a Service Creation Environment (SCE), etc; the functions of their functional entities are identical or similar although the service logics created and executed may be different.

However, while in the GSM/WCDMA CAMEL mobile IN, the CAMEL services are implemented through the collaboration of the CAP and the MAP, and the gsmSCF, the gsmSSF and the gsmSRF interact with each other through the CAP protocol, in the CDMA ANSI-41 WIN, interactions between the SCP and the SSP and between the SCP and the IP are implemented through different protocols, i.e., the ANSI-41 WIN protocol is the supplement of the ANSI-41 MAP protocol. Besides, though the CDMA ANSI WIN and the GSM/WCDMA CAMEL mobile IN share similarities in call model, trigger mechanism, etc., they are more or less different.

On the other hand, the IMS which adopts the IP packet switched domain as the bearer channel for its control signaling and media transmission, and adopts Session Initiation Protocol (SIP) as call control signaling, is introduced as an objective network of the WCDMA mobile network for implementing packet switched voice and packet switched data services and for providing uniform multimedia services and applications. In the IMS network, IP Multimedia (IM) value-added services are provided for IMS subscribers through various Application Servers (ASs), including an SIP AS, an Open Service Access Service Capability Server (OSA SCS) and an IP Multimedia Service Switching Function (IM-SSF), where, the IM-SSF provides mapping between the SIP protocol in the IMS and the CAP protocol in the circuit switched domain, and the SSP triggering capability, which enables IMS domain subscribers, e.g., subscribers of VoIP service, to seamlessly inherit the intelligent services provided in the WCDMA circuit switched domain.

FIG. 3 is a schematic diagram illustrating the IM-SSF interfaces. The IM-SSF supports three interfaces: a CAP interface, an ISC interface and an Si interface, where, the CAP interface is used for the interaction between the IM-SSF and the CAMEL Service Environment including the gsmSCF enabling the service control of the gsmSCF, and the ISC interface is used for the interaction between the IM-SSF and a Serving-Call Session Control Function (S-CSCF) enabling the service control of IP multimedia sessions. Via these two interface, the gsmSCF can finally perform corresponding control according to inside intelligent service logic through the IM-SSF over the IP multimedia sessions which are transmitted through the S-CSCF; and the Si interface between the IM-SSF and a Home Subscriber Server (HSS) is based on the MAP, and is used for downloading and updating CAMEL subscription data from the HSS.

In general, the foregoing technology in the prior art enables the IMS subscribers to seamlessly inherit the intelligent services of the WCDMA circuit switched domain through the mapping between the IMS SIP and the CAP protocol in the circuit switched domain and the SSP triggering capability provided by the IM-SSF.

SUMMARY OF THE INVENTION

The present invention provides a method and system for providing a subscriber with an intelligent service, which provides the subscriber in the IP Multimedia Subsystem (IMS) domain with special services of intelligent platforms which adopt intelligent control protocol other than Customized Application for Mobile network Enhanced Logic (CAMEL) Application Part (CAP) protocol in interaction, and convergent services controlled by various intelligent platforms jointly, and may entertain the subscriber with richer service experiences and improve the operation and development of the IMS network.

A method for providing a subscriber of an Internet Protocol (IP) Multimedia Subsystem (IMS) with an intelligent service, wherein, the IMS includes an IP Multimedia Service Switching Function (IM-SSF) entity supporting an intelligent control protocol other than a Customized Application for Mobile network Enhanced Logic (CAMEL) Application Part (CAP) protocol, the method includes:

upon receiving a session establish request related to the subscriber, the IM-SSF triggering the intelligent service to a Service Control Function (SCF) entity of a corresponding intelligent platform through the intelligent control protocol other than the CAP protocol according to obtained subscription information.

A system for providing a subscriber with an intelligent service, including:

a home Internet Protocol (IP) Multimedia Subsystem (IMS) of the subscriber and an intelligent platform adopting an intelligent control protocol other than a Customized Application for Mobile network Enhanced Logic (CAMEL) Application Part (CAP) protocol, wherein, the IMS includes at least an IP Multimedia Service Switching Function (IM-SSF) entity supporting the intelligent control protocol other than the CAP protocol, for triggering, according to obtained subscription information, the intelligent service to a Service Control Function (SCF) of a corresponding intelligent platform through the intelligent protocol other than the CAP protocol, upon receiving a session establish request related to the subscriber.

Comparing the solution provided in the present invention with the solution in the prior art, it can be seen that the IM-SSF which supports the intelligent control protocol other than the CAP protocol is added into the IMS, and the IM-SSF triggers the intelligent services to the SCF of the corresponding intelligent platform through the intelligent control protocol other than the CAP protocol according to the obtained subscription information. The subscription information can be pre-configured in the IM-SSF, or downloaded from the HSS by the IM-SSF when a subscriber registers or a service request related to a subscriber is handled, e.g., when a request of registration or session establishment correlative with the served subscriber is received by the IM-SSF.

The IM-SSF is an independent entity that supports one or multiple intelligent control protocols other than the CAP protocol, or an entity supports the CAP protocol and another intelligent control protocol at the same time, or an entity supports the CAP protocol and multiple other intelligent control protocols at the same time.

When the IM-SSF supports multiple protocols including the CAP protocol and one or more other intelligent control protocols, or supports multiple intelligent control protocols other than the CAP protocol at the same time, it selectively use one of the supported intelligent control protocols to trigger relevant intelligent services of corresponding intelligent platform according to extended subscription information type, or according to protocol settings corresponding to the service keys or SCF addresses in the subscription information, or according to global protocol settings. The IM-SSF can support the intelligent control protocol other than the CAP protocol directly, or through a signaling conversion gateway between the CAP protocol and other intelligent control protocols.

Such differences in technical solutions bring obvious benefits, i.e., the present invention provides a solution for the cooperation between the IMS services and the intelligent platforms adopting the intelligent control protocol other than the CAP protocol, e.g., the intelligent platform of the fixed IN and/or the ANSI-41 WIN intelligent platform. The solution enables the IMS domain subscribers to obtain not only the GSM/WCDMA CAMEL mobile intelligent services, but also special services provided by the intelligent platforms which adopt intelligent control protocol other than the CAP protocol, such as the fixed IN and/or the ANSI-41 WIN intelligent platform, or convergent services controlled by various intelligent platforms jointly. Moreover, the IM-SSF triggers the intelligent services to the SCFs of different intelligent platforms according to the intelligent service subscription information of the subscribers, and thus achieves an per-subscription-based and flexible triggering mechanism which enriches the intelligent service triggering methods in the fixed IN.

BRIEF DESCRIPTION OF THE DRAWINGS

FIG. 1 is a schematic diagram illustrating the system architecture of an IN;

DETAILED DESCRIPTION OF THE INVENTION

Figure 1:
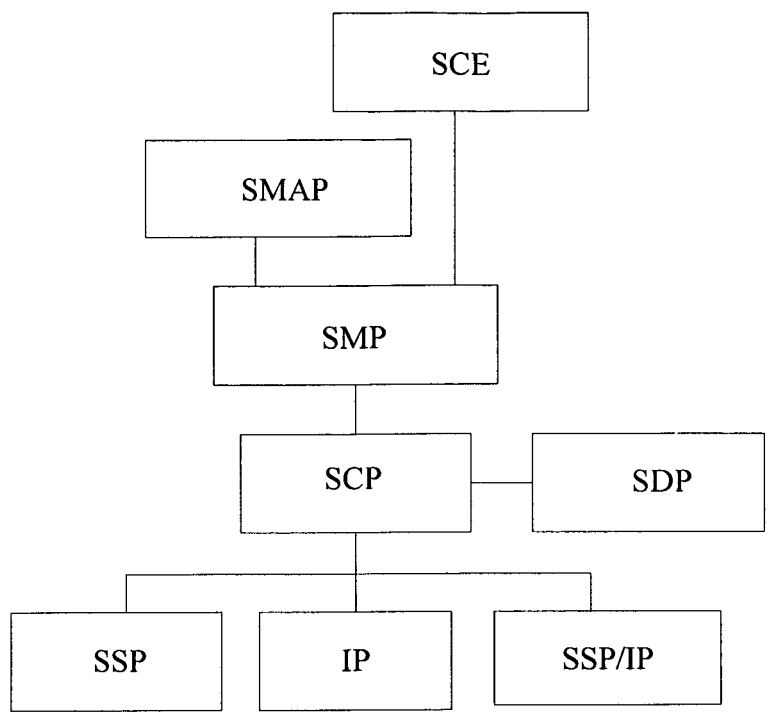
Figure 2A:
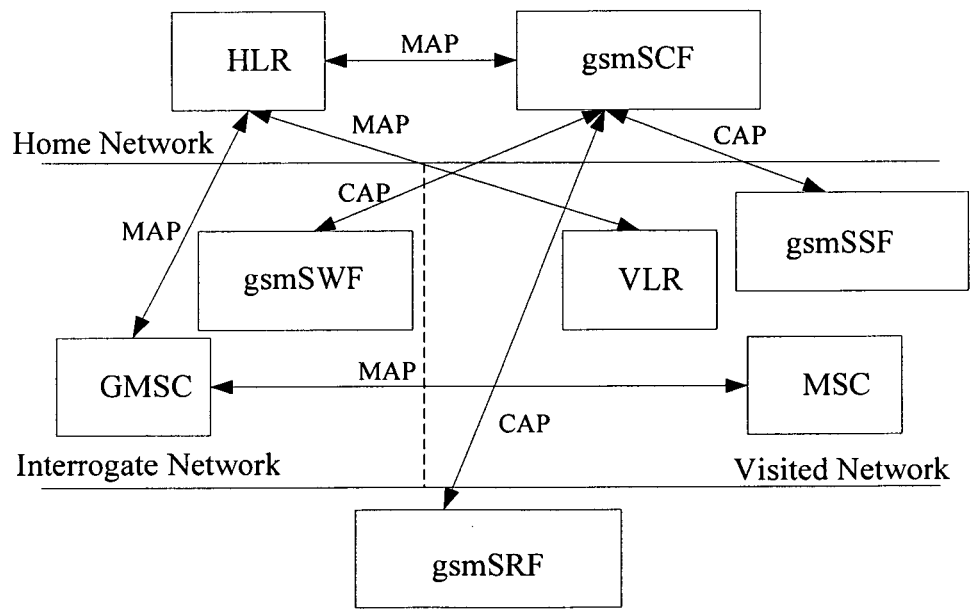
FIG. 2A is a diagram illustrating the functional architecture of a WCDMA circuit switched domain that supports CAMEL.
Figure 2B:
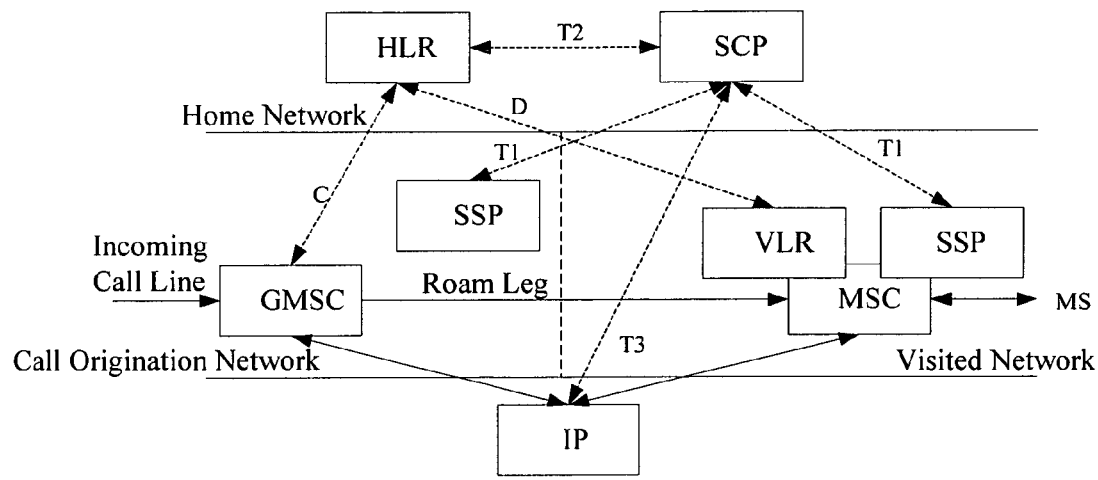
FIG. 2B is a diagram illustrating the functional architecture of an ANSI-41 WIN.
Figure 3:
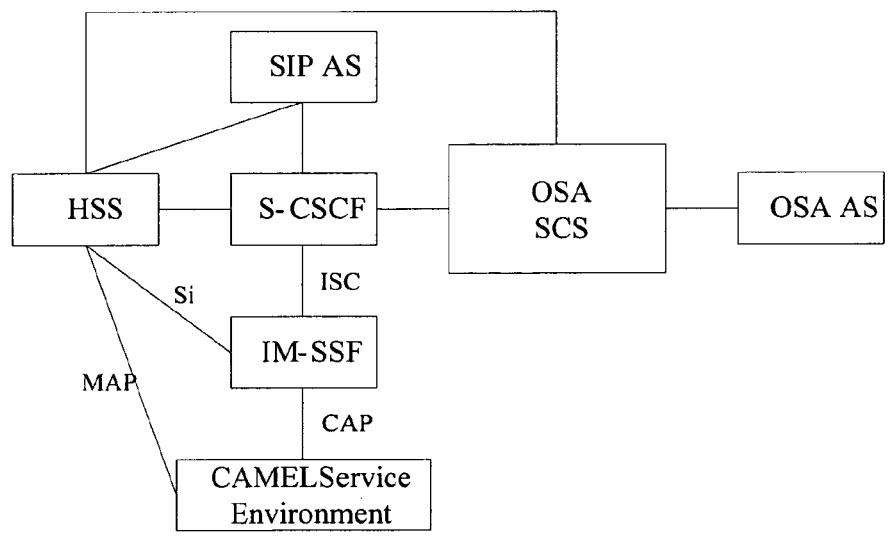
FIG. 3 is a schematic diagram illustrating the interfaces between an IM-SSF and other modules.

In order to make the objectives, technical solutions and advantages of the present invention more explicit, the present invention is described in detail with reference to the embodiments and the drawings hereinafter.

Firstly the fundamental theory of the embodiment of the present invention is explained hereinafter. The embodiments of the present invention extends the function of a network element IM-SSF, enables the IM-SSF to support, either directly or through a gateway, mapping between the SIP and the intelligent control protocol other than the CAP protocol; after function extension, the IM-SSF can support either one intelligent control protocol other than the CAP protocol, or multiple protocols, e.g., multiple intelligent control protocols other than the CAP protocol, or the CAP protocol and another intelligent control protocol, or the CAP protocol and multiple intelligent control protocols. The embodiments of the present invention also offer a method for protocol selection for the IM-SSF which supports multiple intelligent protocols, in which the protocols are selected according to extended intelligent service subscription information types, or protocol settings in the IM-SSF for service keys or SCF addresses in the intelligent service subscription information, or global protocol settings in the IM-SSF, so that the IM-SSF can trigger corresponding intelligent services.

The intelligent control protocols other than the CAP protocol include: the INAP, the ANSI-41 MAP protocol, various CoreINAPs defined by adding different extensions on the base of the INAP (e.g., the CoreINAP compiled by European Telecommunications Standards Institute [ETSI] Technical Committee on Signaling Protocol & Switch Technology in October 1994, the CoreINAP defined by Ericsson, Siemens, etc., by defining their private extensions), or any combination of the above.

The present invention is described hereinafter in the aspects of function extension patterns, network element organization forms and protocol selection methods, with reference to an example in which the IM-SSF is able to support the INAP and/or the ANSI-41 MAP protocol.

Firstly, the IM-SSF can extend functions to support the INAP and/or the ANSI-41 MAP protocol in two ways.

The first function extension pattern is extending the local support capability of the IM-SSF: the IM-SSF directly maps multiple SIP messages to multiple Detection Points (DPs) in a Basic Call State Model (BCSM) defined by the INAP and/or the ANSI-41 WIN criteria, and supports the interface to the SCF of the corresponding intelligent platform; under the control of the SCF of the corresponding intelligent platform, the IM-SSF performs the service control over the SIP session triggered by the S-CSCF through the ISC interface. As explained above, the CAP protocol is defined on the base of the INAP, in another word, the CAP protocol is similar to the INAP with basically the same definitions on the DPs, and the IM-SSF can support the mapping between the SIP and the CAP in the prior art, therefore, it is easy to be understood that the IM-SSF can directly support the INAP after the above function extension. Concerning the support of the ANSI-41 WIN by the IM-SSF, it can be seen that although the CAP protocol and the ANSI-41 MAP protocol are different, the CDMA ANSI-41 wireless IN and the GSM/WCDMA CAMEL mobile IN are both derived from the fixed IN, which means they have similar concept models, identical or similar functions of the functional entities and a lot of similarities in the call model, the triggering mechanism, etc. of the fixed IN. On the other hand, as to the DPs defined by the BCSM for triggering the service control, in the CDMA ANSI-41 WIN, there only defined DPs of Origination_Attempt_Authorized, Collected_Information, Analyzed_Information, Originating_Answer O_Answer, Originating_Disconnect (O_Disconnect), Originating_Called_Party_Busy (O_Called_Party_Busy) and Originating_No_Answer (O_No_Answer) in an originating BCSM (O-BCSM) till IS848, while in GSM/WCDMA CAMEL, there exist other DPs including a Route_Select_Failure DP (4), an Originating_Not_Reachable DP (O_Not_Reachable DP) (50) and an Originating_Abandon DP (O_Abandon DP) (10) besides the above DPs in the O-BCSM. As to a Terminating BCSM (T-BCSM), the CDMA ANSI-41 WIN only defines 5 DPs for triggering the service control: the DPs of a Facility_Selected_and_Available, a Terminating_Answer (T_Answer), a Terminating_Disconnect (T_Disconnect), a Terminating_Busy (T_Busy) and a Terminating_No_Answer (T_No_Answer). However, in the T-BCSM of the GSM/WCDMA CAMEL, two more DPs, which are Terminating_Not_Reachable DP (T_Not_Reachable DP) (51) and Terminating_

Abandon DP (T_Abandon DP) (18), are supported besides the above five ones. It can be seen that there are more DPs defined in the BCSM of the GSM/WCDMA CAMEL than in the CDMA ANSI-41 WIN, so it is also easy to be understood that the IM-SSF can directly support the ANSI-41 MAP protocol after the foregoing function extension.

However, definitions of the DPs in the CDMA WIN criteria are still different from those in the GSM/WCDMA CAMEL criteria. Every DP in the CDMA ANSI-41 WIN has many triggers, which means a DP is valid only when the DP is equipped with the trigger. One DP can be equipped with more than one triggers, which enables the DP to detect various events and send messages to the SCF for many times. In the GSM CAMEL, a DP does not have triggers, and each DP is an estimation condition. Therefore in such situation the IM-SSF which has upgraded to support the ANSI-41 MAP protocol can be further enhanced to support estimation on the special triggers in the CDMA ANSI-41 WIN.

The second function extension pattern is adopting a signaling conversion gateway which performs the protocol conversion between the CAP protocol and the INAP, and/or between the CAP protocol and the ANSI-41 MAP protocol: the IM-SSF accomplishes the mapping of multiple SIP messages to multiple CAMEL DPs and supports the CAP interface between itself and the gsmSCF, completes the mapping of the CAP protocol to the INAP and/or the ANSI-41 MAP protocol through the corresponding signaling conversion gateway which is logically independent, interacts with the SCF of the corresponding intelligent platform through the gateway, and further achieves the service control over the SIP session triggered by the S-CSCF through the ISC interface under the control of the SCF. The gateway can be implemented internally or externally. That is to say, the IM-SSF logically accomplishes the support from the SIP to the CAP protocol firstly in this pattern, and then the signaling conversion gateway completes the mapping of the CAP interface to the INAP and/or the ANSI-41 MAP interface. The whole process is the combination of the above two steps. According to the foregoing analysis, the similarities between the CAP protocol and the INAP, and between the CAMEL and the ANSI WIN, guarantee the support to the INAP and/or the ANSI-41 MAP protocol through this pattern. The signaling conversion gateway here is just logically independent from the IM-SSF, and physically, the IM-SSF and the signaling conversion gateway can be set either in one entity or in different entities.

In the second function extension pattern, the triggering of the DP is performed exactly according to the GSM/WCDMA CAMEL criteria, therefore only the corresponding triggering capability is provided. As there are more DPs defined in the BCSM of the GSM/WCDMA CAMEL than in the CDMA ANSI-41 WIN, redundant messages can further be blocked in the gateway.

It is understood by those skilled in the art that the IM-SSF can extend functions to support the INAP and/or the ANSI-41 MAP protocol through either of the two patterns described above without influencing the essence and scope of the present invention.

Two different organization forms of the IM-SSF with the extended functions are hereinafter described.

The first organization form is combining the IM-SSF which supports interaction with the fixed IN and/or the ANSI-41 WIN intelligent platform and the original IM-SSF which supports interaction with the GSM/WCDMA CAMEL mobile intelligent platform in the IMS network, that is to say, adding the function that supports interaction with the fixed IN and/or the ANSI-41 WIN intelligent platform into the original IM-SSF which supports interaction with the GSM/WCDMA CAMEL mobile intelligent platform, which means, putting two functions in one entity. Then there is a problem of protocol selection for an entity which has at least two protocol functions, which will be described in detail later.

The second organization form is setting one IM-SSF which is independent from and paratactic with the original one, to support the INAP and/or the ANSI-41 MAP protocol and to interact with the fixed IN and/or the ANSI-41 MAP protocol intelligent platform. That is to say, setting up two entities, one is used for supporting the original CAP protocol, and the other is used for supporting the newly added INAP and/or the ANSI-41 MAP protocol; or setting up three entities, which are used for supporting the original CAP protocol, the newly added INAP and the newly added ANSI-41 MAP protocol respectively.

The protocol selection is not needed in the second organization form in which one IM-SSF only supports one protocol, i.e., the paratactic and stand-alone IM-SSFs support the original CAP protocol, the newly added INAP and the newly added ANSI-41 MAP protocol respectively and interact with their corresponding intelligent platforms, yet there exists another problem that which IM-SSF should be triggered by the S-CSCF for interacting with intelligent platform to control the services for a certain session. Such problem is settled by the S-CSCF according to a matching result of initial Filter Criteria (iFC) in the subscription data of the subscribers. The S-CSCF can selectively trigger to either the IM-SSF that supports interaction with the GSM/WCDMA CAMEL mobile intelligent platform or the IM-SSF that supports interaction with the fixed IN and/or the ANSI-41 WIN intelligent platform, or trigger to both the IM-SSFs that support interaction with the GSM/WCDMA CAMEL mobile intelligent platform and interaction with the fixed IN and/or the ANSI-41 WIN intelligent platform respectively, so as to achieve combined control over the IMS session by the GSM/WCDMA CAMEL intelligent platform and the fixed IN and/or the ANSI-41 WIN intelligent platform, and thus to provide convergent services.

A brief introduction of the iFC is given below. It is commonly known by those skilled in the art that the iFC is a major part in the subscriber data saved in the HSS, including matching condition, AS address, default handling in case of trigger failure, transparent service information, etc. There can be multiple iFCs with different priorities for a subscriber; the S-CSCF matches the SIP message of service request with the iFCs one by one according to their priorities. If the SIP message matches an iFC, the SIP message will be routed to the corresponding AS, and the message can be terminated or modified by the AS and may be returned after the AS finishes processing; if the SIP message does not match an iFC or is returned by the AS, the S-CSCF will match the SIP message with the next iFC in the descending priority sequence and perform the service triggering. If the next iFC also fails to match the SIP message, or the message is returned again by the AS after the triggering, then the S-CSCF will turn to the third iFC in the descending priority sequence and perform the service triggering, and the rest can be deducted by analogy. In this way the service can be triggered to multiple ASs from one node and is controlled in sequence.

The protocol selection methods in the first organization form are listed below, in which an IM-SSF supports two or more protocols among the CAP protocol, the INAP and/or the ANSI-41 MAP protocol:

The first protocol selection method is to extended define intelligent service subscription information types dedicated to different SCFs. That is to say, besides the original types of intelligent service subscription information (abbreviated as CSI which stands for CAMEL service subscription information) for the IMS domain, we can in addition define IMS INAP Originating CSI (O IM INAP CSI) used for session originating side service, IMS INAP Dialed Service CSI (D IM INAP CSI) used for dialed service, IMS INAP Visited Mobile Switch Center (VMSC) Terminating CSI (VT IM INAP CSI) used for session terminating side service, or any combination of the above, and use all of them as subscription information types dedicated to the intelligent services which are provided by collaborating with the SCF of the fixed IN; we can also define IMS ANSI Originating CSI (O IM ANSI CSI), IMS ANSI Dialed Service CSI (D IM ANSI CSI) and IMS ANSI VMSC Terminating CSI (VT IM ANSI CSI), as subscription information types dedicated to the intelligent services which are provided by collaborating with the ANSI-41 WIN SCF. The matching test for these types of subscription information is performed by the IM-SSF at corresponding DPs to trigger the services to the SCF of the fixed IN and/or the ANSI-41 WIN. The corresponding DPs refer to one or any combination of the following DPs: a DP Collected_Info, a DP Analysed_Information, a DP Route_Select_Failure, a DP Terminating_Attempt, a DP T_Busy and a DP T_No_Answer. It should be noted that the subscription information can be set in advance in the IM-SSF, or be downloaded from the HSS through the Si interface. If the subscription information is to be downloaded from the HSS, the HSS and the Si interface need to be extended to download and/or update above mentioned extended types of the subscription information.

Moreover, compared with the original triggering methods in the fixed IN, the above method in which the IM-SSF can trigger the intelligent services to the fixed SCP based on the CSI so as to achieve a per-subscription-based and flexible triggering mechanism for the fixed IN, and thus enrich the intelligent service triggering methods in the fixed IN.

The second protocol selection method is to select the protocols according to the service keys in three existing types of the CSI (the O IM CSI, the D IM CSI and the VT IM CSI). To do so, a match relationship between a specific service key in the CSI and an interface protocol is preset in the IM-SSF which supports two or more protocols. The IM-SSF selects a protocol for the interface to the SCF according to the specific service key in the CSI and its local settings of such service key, and further triggers the services to the SCF of the fixed IN and/or the ANSI-41 WIN. It should be noted that in this method the HSS and the Si interface are implemented completely according to 3rd Generation Partnership Project (3GPP) standards without any extra extension, in another word, the HSS and the Si interface does not need to be extended even if the subscription information needs to be downloaded from the HSS; but the IM-SSF needs extra configuration data to select the protocol for the interface to the SCF according to the specific information in the CSI.

The third protocol selection method is to select the protocols according to the SCF address in the IM-SSF. To do so, configuration data of the match relationships between the SCF addresses and the interface protocols are added to the IM-SSF which supports two or more protocols. The IM-SSF selects the protocol for the interface to the SCF according to the SCF address designated by the original three types of CSIs and its local settings of such SCF address in the IM-SSF, and further triggers the services to the SCF of the fixed IN and/or the ANSI-41 WIN. In this method, similarly, the HSS and the Si can be implemented completely according to the 3GPP standards without any extra extension even if the subscription information needs to be downloaded from the HSS, but the IM-SSF needs to add the SCF address-related configuration data to select the protocol for the interface to the SCF according to the specific information in the CSI.

The fourth protocol selection method is to select the protocol through the IM-SSF global settings. The global settings are made in the IM-SSF which supports two or more protocols, making the IM-SSF support only one protocol among the protocols it has capability to support in a certain period of time. In this method the HSS and the Si interface also can be implemented completely according to the 3GPP standards, and the IM-SSF selects the protocol for the interface to the SCF according to the global settings only. The difference between this method and the second and third methods is that the settings are independent from any specific information in the CSI in this method.

Besides achieving the capabilities defined in 23.278 and the mapping of the INAP and/or the ANSI-41 MAP protocol, the IM-SSF also supports the CPH capability of the CAP protocol, the INAP and/or the ANSI-41 MAP protocol and maps the intelligent service control process belongs to the CPH capability to corresponding SIP session control process, and thus to achieve richer service control in cooperation with the SCF of the fixed IN and/or the ANSI-41 WIN.

The working procedure of the IM-SSF that is able to trigger the intelligent services to the fixed IN and/or the ANSI-41 WIN is hereinafter described with reference to the accompanying Figures from FIG. 4 to FIG. 8.

Figure 4:
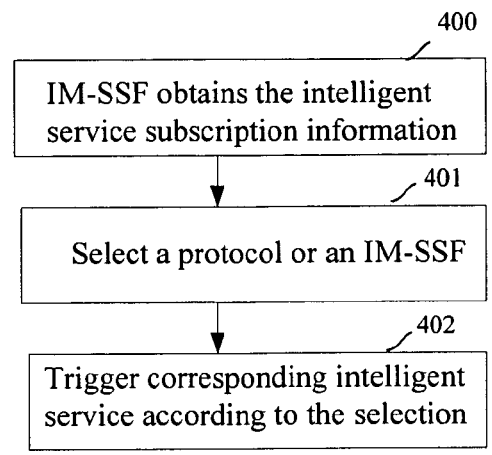
FIG. 4 is a flowchart of an IM-SSF which is able to trigger the intelligent services to the fixed IN and/or the ANSI-41 WIN in accordance with an embodiment of the present invention.

The working procedure of the IM-SSF platform that is able to trigger the intelligent services of the fixed IN and/or the ANSI-41 WIN can be divided into three parts, which are shown in FIG. 4.

As shown in FIG. 4, firstly, in Step 400, the IM-SSF obtains the CSI. The CSI can be set in the IM-SSF in advance or be downloaded from the HSS, for example, when a subscriber registers or a subscriber service request is handled, the IM-SSF downloads the subscription information of the subscriber upon receiving a request of registration or session establishment correlative with the served subscriber. The process in which the IM-SSF downloads the CSI from the HSS is described in details with reference to FIG. 5.

Figure 6:
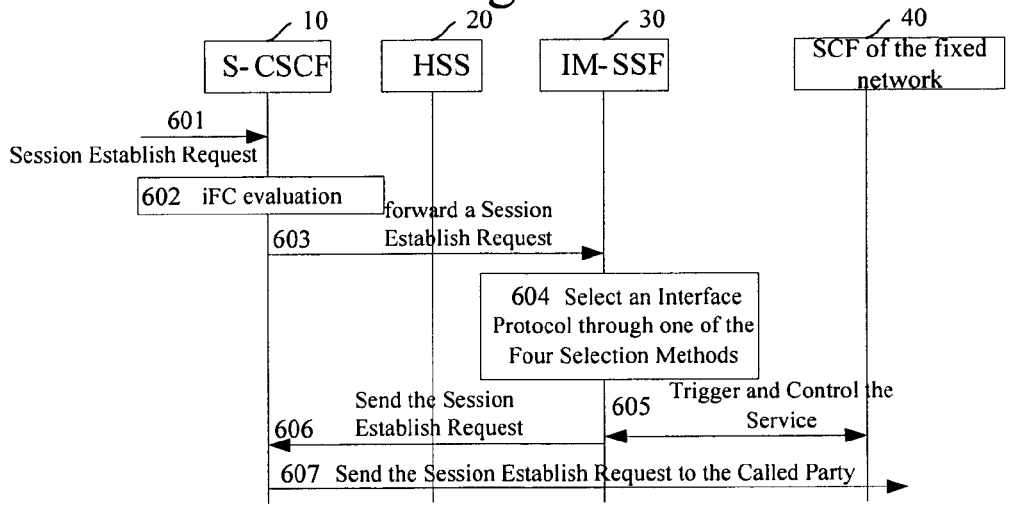
FIG. 6 is a flowchart illustrating intelligent service triggering to corresponding intelligent platform performed by an IM-SSF which directly supports multiple intelligent control protocols in accordance with an embodiment of the present invention.
Figure 7:
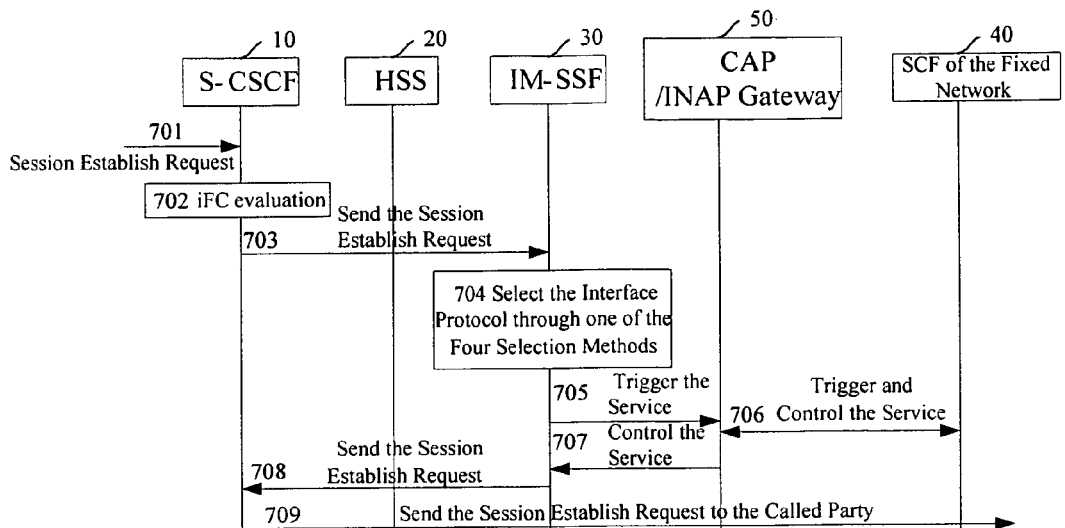
FIG. 7 is a flowchart illustrating the intelligent service triggering to corresponding intelligent platform performed by an IM-SSF which supports multiple intelligent control protocols through a gateway in accordance with an embodiment of the present invention.
Figure 8:
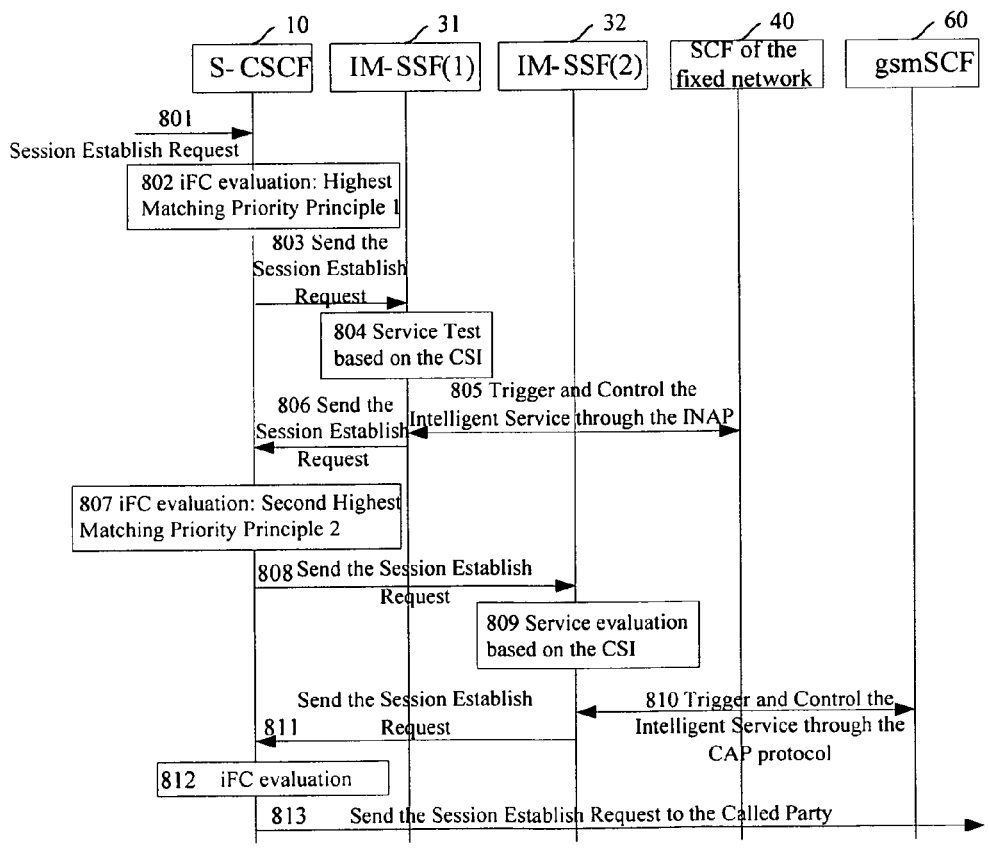
FIG. 8 is a flowchart illustrating the intelligent service triggering to different intelligent platforms performed by paratactic IM-SSFs supportingg different intelligent protocol in accordance with an embodiment of the present invention.

Secondly, the protocol or the IM-SSF is selected in Step 401. The selection process is distinguished according to different organization forms. If the first organization form is adopted by the platform, in which an IM-SSF supports two or more protocols among the INAP and/or the ANSI-41 MAP protocol and the CAP protocol, the protocol selection should be performed in such an IM-SSF, and the detailed selection procedure is shown in FIG. 6 and FIG. 7; if the second organization form is adopted by the platform, in which different IM-SSFs support different protocols, e.g., as to the two IM-SSFs in the embodiment of the present invention shown in FIG. 8, IM-SSF (1) supports the INAP and/or the ANSI-41 MAP protocol, IM-SSF (2) supports the CAP protocol, an IM-SSF selection is needed. The detailed procedure of the IM-SSF selection is shown in FIG. 8.

Finally, the intelligent service is triggered in Step 402 based on the result of the selection process. The technique through which the IM-SSF triggers the service to the GSM/WCDMA CAMEL mobile intelligent platform is in the prior art, therefore the following embodiments of the present invention show only the intelligent service triggering to the fixed IN and/or the ANSI-41 WIN. It should be noted that there are two methods through which the IM-SSF can trigger the intelligent services to the SCF of the fixed IN and/or the ANSI-41 WIN, and the two methods are related to the function extension pattern of the IM-SSF to support the intelligent service control protocol other than the CAP. If the first function extension pattern is adopted, in which the IM-SSF directly supports the INAP and/or the ANSI-41 MAP protocol, the IM-SSF directly interacts with the SCP of the fixed IN and/or the ANSI-41 WIN, and the procedure of this pattern is shown in FIG. 6; if the second function extension pattern is adopted, in which the IM-SSF supports the INAP and/or the ANSI-41 MAP protocol through a signaling conversion gateway performing signaling conversion between the CAP protocol and the INAP, and/or between the CAP protocol and the ANSI-41 WIN, the IM-SSF interacts with the SCP of the fixed IN and/or the ANSI-41 WIN through the above mentioned gateway, and the procedure of this pattern is shown in FIG. 7.

It should be noted that the procedure shown in FIG. 4 is a preferred embodiment of the present invention. If different IM-SSFs supporting different protocols are adopted, and the IM-SSFs download the intelligent service subscription information only upon receiving a request of session establishment correlative with the served subscriber, Step 400 and Step 401 can be executed in a reversed order, which also belongs to the scope of the embodiments of the present invention.

Figure 5:
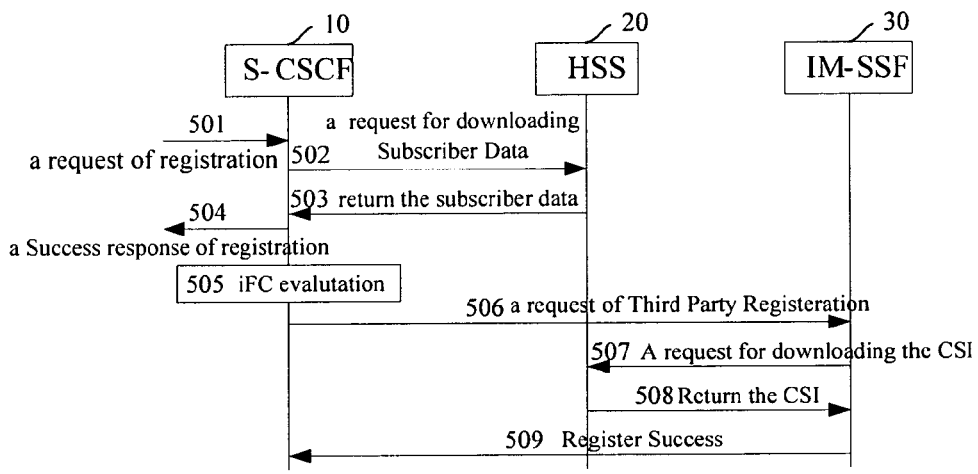
FIG. 5 is a flowchart of an IM-SSF which downloads intelligent service subscription information from an HSS in accordance with an embodiment of the present invention.

The process through which the IM-SSF requests to download the CSI from the HSS is described hereinafter with reference to FIG. 5. As a preferred embodiment of the present invention, the IM-SSF sends a download request to the HSS for the intelligent service subscription information of the subscriber when it receives from, the S-CSCF a request of the Third Party Registration which is initiated based on the iFC evaluation after the subscriber's register is handled, and then the IM-SSF returns a success message to the S-CSCF. The detailed steps are described below:

Firstly, in Step 501, S-CSCF 10 receives a request of registration from a subscriber. So S-CSCF 10 sends a request to HSS 20 for downloading subscriber data in Step 502. In Step 503, HSS 20 returns a response of the download request to S-CSCF 10, and provides the subscriber data. Upon receiving such response, S-CSCF 10 sends a success response of registration to the subscriber in Step 504.

Then S-CSCF 10 runs an iFC evaluation on the subscriber data downloaded in Step 505. After that, in Step 506, S-CSCF 10 sends a request of Third Party Registration to the IM-SSF 30 according to the iFC evaluation result.

IM-SSF 30 then requests to download the CSI from the HSS 20 through the Si interface which is based on the MAP protocol in Step 507. Upon receiving the request, HSS 20 returns the required CSI to IM-SSF 30 in Step 508. It should be noted that if IM-SSF 30 selects the protocol according to extended intelligent service subscription information types that are defined dedicated to the SCF of the fixed IN and/or the ANSI-41 WIN, HSS 20 and the Si interface both need to be extended to support the downloading and updating of the extended subscription information type; otherwise HSS 20 and the Si interface are implemented completely according to the 3GPP standards.

Upon obtaining the CSI, IM-SSF 30 returns a success response to S-CSCF 10 in Step 509.

If the intelligent service subscription information is set in advance in the IM-SSF, the above process can be omitted.

In this embodiment, the IM-SSF downloads the intelligent service subscription information upon receiving the request of the Third Party Registration initiated by the S-CSCF. Similarly, the IM-SSF can also perform Step 507 and Step 508 to download the intelligent service subscription information upon receiving the session establish request correlative with the served subscriber.

The detailed process in which an IM-SSF that supports the INAP and/or the ANSI-41 MAP protocol and the CAP protocol at the same time triggers the intelligent service to the fixed IN and/or the ANSI-41 WIN is described hereinafter with reference to the accompanying drawings of FIG. 6 and FIG. 7. To simplify the description, the intelligent service triggering process of an IM-SSF which supports only the INAP and the CAP protocol at the same time is described hereinafter. It can be deduced from the above description that the intelligent service triggering process of an IM-SSF which supports the ANSI-41 MAP protocol and the CAP protocol at the same time, or supports the ANSI-41 MAP protocol and the INAP at the same time, or supports the INAP, the ANSI-41 MAP protocol and the CAP protocol at the same time, is completely similar to the process described below.

To be specific, FIG. 6 illustrates the process in which the IM-SSF supports the INAP directly, and FIG. 7 illustrates the process in which the IM-SSF supports the INAP through the CAP protocol/the INAP gateway.

In FIG. 6, the first step of the process is Step 601, in which S-CSCF 10 receives a request of session establishment correlative with the served subscriber. Then S-CSCF 10 runs the iFC evaluation on the subscriber data in Step 602. After that, in Step 603, S-CSCF 10 forwards the session establish request to IM-SSF 30 according to the iFC evaluation result.

Upon receiving the session establish request, IM-SSF 30 proceeds to Step 604, to select the interface protocol for the intelligent service triggering through one of the four protocol selection methods according to the CSI pre-configured in the IM-SSF or downloaded from the HSS.

When the CSI is not pre-configured in IM-SSF 30 or downloaded by IM-SSF 30 during the subscriber registration, IM-SSF 30 can also download the CSI after the request is received before Step 604.

The four protocol selection methods here refer to:

the first protocol selection method: defining extended intelligent service subscription information types that dedicated to the fixed SCF;

the second protocol selection method: selecting the protocols according to the service keys in the CSI and the settings which correspond to the service keys in the IM-SSF;

the third protocol selection method: selecting the protocols according to the SCF addresses in the CSI and the settings which correspond to the SCF addresses in the IM-SSF;

the fourth protocol selection method: selecting the protocols according to the global settings in the IM-SSF.

Upon selecting the protocol, the IM-SSF interacts with the corresponding SCF. The embodiment here only shows the interaction between the IM-SSF and the fixed IN SCF 40. In Step 605, IM-SSF 30 interacts with fixed IN SCF 40 through the INAP to trigger and control the intelligent service.

Then in Step 606, IM-SSF 30 continues with the following procedures according to the response from fixed IN SCF 40, i.e., the result of service control according to intelligent service logic; that is to say, IM-SSF 30 returns to S-CSCF 10 the session establish request which is modified according to the service logic, and thus realizing the control of the intelligent service. And in Step 607, S-CSCF 10 continues to send the session establish request to the called party.

FIG. 7 illustrates the procedure of the IM-SSF which supports the INAP through a CAP protocol/INAP gateway. The procedure is basically identical to the procedure illustrated in FIG. 6.

The first step of the procedure is Step 701, in which S-CSCF 10 receives a session establish request. Then S-CSCF 10 runs the iFC evaluation on the subscriber data in Step 702. After that, in Step 703, S-CSCF 10 forwards the session establish request to IM-SSF 30 according to the iFC evaluation result.

Upon receiving the session establish request, IM-SSF 30 proceeds to Step 704, to select the interface protocol for the intelligent service triggering through one of the four protocol selection methods according to the CSI pre-configured in the IM-SSF or downloaded from the HSS.

Similarly, in case that the CSI is not pre-configured in IM-SSF 30 or downloaded by IM-SSF 30 during the subscriber registration, IM-SSF 30 can also download the CSI after the request is received before Step 704.

If the IM-SSF selects the INAP as the interface protocol, IM-SSF 30 sends a service trigger message to CAP protocol/INAP Gateway 50 through the CAP protocol in Step 705. Upon finishing the conversion, CAP protocol/INAP Gateway 50 performs interaction such as service triggering and service controlling with fixed IN SCF 40 through the INAP in Step 706. In Step 707 CAP protocol/INAP Gateway 50 returns a service control message to IM-SSF 30 through the CAP protocol. Then in Step 708, IM-SSF 30 continues with the following procedures according to the service control result, that is to say, IM-SSF 30 returns to S-CSCF 10 the session establish request which is modified according to the service logic, and thus realizing the control of the intelligent service. And in Step 709, S-CSCF 10 continues to send the session establish request to the called party.

If the system adopts the second organization form, in which different IM-SSFs support different protocols, the IM-SSF selection process is needed. The S-CSCF sends the SIP session establish request to an IM-SSF selected according to the iFC evaluation result, or to several IM-SSFs in sequence. To simplify the description again, the IM-SSF selection process in which there are only two IM-SSFs that support the INAP and the CAP protocol respectively is described hereinafter. However, it can be deduced from the above description that the IM-SSF selection process, in which an IM-SSF that supports the ANSI-41 MAP protocol is added, or an IM-SSF that supports the ANSI-41 MAP protocol replaces either of the above two IM-SSFs, is completely identical to the process described below.

It is shown in FIG. 8 when IM-SSF 31 supports the INAP, IM-SSF 32 supports the CAP protocol, the IM-SSF selection process is needed and the detailed IM-SSF selection process is illustrated in FIG. 8. It should be noted that in such organization form, S-CSCF 10 sends the SIP session establish request to the selected one of the two IM-SSFs according to the iFC evaluation result, or to both the IM-SSFs in sequence. As a preferred embodiment of the present invention, the flow in which the request is sent to two IM-SSFs in sequence, is shown in FIG. 8.

Firstly in Step 801, S-CSCF 10 receives the session establish request. Then in Step 802, S-CSCF 10 runs the iFC evaluation according to the priorities of the iFCs in a descending order. Then as a result of successfully matching of the iFC1 with the highest priority, S-CSCF 10 forwards the session establish request to IM-SSF (1) 31 which supports interaction with the intelligent platform of the fixed IN.

Upon receiving the request, IM-SSF (1) 31 proceeds to Step 804, to run the CSI evaluation and the triggering of the intelligent service according to the CSI pre-configured in the IM-SSF or downloaded from the HSS. In Step 805, IM-SSF (1) 31 interacts with fixed IN SCF 40 through the INAP to trigger and control the intelligent service. Then in Step 806, IM-SSF (1) 31 continues with the following procedures according to the service control result of fixed IN SCF 40, and in this embodiment particularly, IM-SSF (1) 31 returns to S-CSCF 10 the session establish request which is modified according to the service logic, and thus realizing the control of the intelligent service on the fixed IN.

Upon receiving the session establish request returned by IM-SSF (1) 31, S-CSCF 10 proceeds to Step 807 to continue with the iFC evaluation for the left iFCs with lower priorities. And as a result of successfully matching of the iFC2 with second highest priority, in Step 808, S-CSCF 10 forwards the session establish request to IM-SSF (2) 32 which supports interaction with the GSM/WCDMA CAMEL mobile IN platform.

Similarly, upon receiving the request, IM-SSF (2) 32 proceeds to Step 809, to run the CSI evaluation and the triggering of the intelligent service according to the CSI pre-configured in the IM-SSF or downloaded from the HSS. In Step 810, IM-SSF (2) 32 interacts with gsmSCF 60 through the CAP protocol to trigger and control the intelligent service. Then in Step 811, IM-SSF (2) 32 continues with the following process according to the service control result of gsmSCF 60, and in this embodiment particularly, IM-SSF (2) 32 returns to S-CSCF 10 the session establish request which is modified according to the service logic, and thus realizing the control of the GSM/WCDMA CAMEL mobile intelligent service.

Upon receiving the session establish request returned by IM-SSF (2) 32, S-CSCF 10 proceeds to Step 812 and to continue with the iFC evaluation for the third iFC in the priority sequence. Upon finishing the iFC evaluation in the descending order of the priority, S-CSCF 10 sends the session establish request to the called party in Step 813.

In this embodiment, it is supposed that the IM-SSF has obtained the CSI when the service request is received, either through pre-configuring in the IM-SSF in advance or through downloading during the subscriber registration. Similarly, if the CSI is not pre-configured in the IM-SSF or downloaded by IM-SSF (1) 31 and/or IM-SSF (2) 32 during the subscriber registration, IM-SSF (1) 31 and/or IM-SSF (2) 32 can also download the CSI upon receiving the service request from the S-CSCF respectively before the next step (Step 805 and Step 810 respectively).

It is understood by those skilled in the art of the present invention that the alteration to the matching priority sequence does not affect the essence or the scope of the present invention; and in the practical implementation, it can be accepted on demand to trigger only the intelligent services of the fixed IN, or the GSM/WCDMA CAMEL mobile intelligent services, or the ANSI-41 WIN intelligent services.

When an IM-SSF is able to trigger the intelligent services of the fixed IN and the ANSI-41 WIN, whatever the function extension pattern and the organization form it takes, the IM-SSF can adopt any of the above four protocol selection methods to select a protocol, therefore no further description will be given here.

Figure 9A:
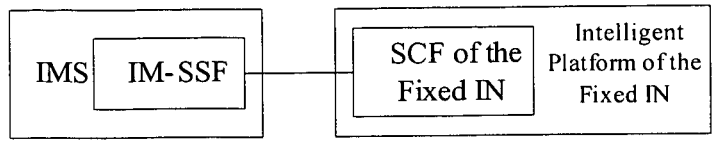
FIG. 9A is a schematic diagram illustrating the system architecture which provides the subscribers with the intelligent services in accordance with Embodiment 1 of the present invention.
Figure 9B:
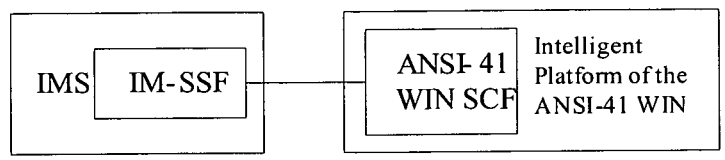
FIG. 9B is a schematic diagram illustrating the system architecture which provides the subscribers with the intelligent services in accordance with Embodiment 2 of the present invention.
Figure 9C:
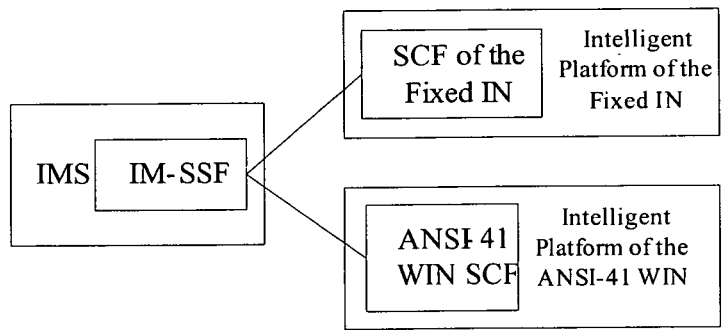
FIG. 9C is a schematic diagram illustrating the system architecture which provides the subscribers with the intelligent services in accordance with Embodiment 3 of the present invention.

The architecture of the system which provides the intelligent services for the subscribers according to the embodiments of the present invention is illustrated in FIG. 9A, FIG. 9B and FIG. 9C. The system includes a home IMS of the subscriber and the intelligent platforms of the fixed IN and/or the ANSI-41 WIN. In FIG. 9A, the IMS at least includes an IM-SSF that supports the INAP to obtain the intelligent service subscription information and trigger the intelligent services to the SCF of the intelligent platform of the fixed IN through the INAP; in FIG. 9B, the IMS at least includes an IM-SSF that supports the ANSI-41 MAP protocol to obtain the intelligent service subscription information and trigger the intelligent services to the SCF of the ANSI-41 WIN intelligent platform through the ANSI-41 MAP protocol; in FIG. 9C, the IMS at least includes an IM-SSF that supports the INAP and the ANSI-41 MAP protocol to obtain the intelligent service subscription information and trigger the intelligent services to the SCF of the intelligent platform of the fixed IN through the INAP, and/or to the SCF of the ANSI-41 WIN intelligent platform through the ANSI-41 MAP protocol.

Though the present invention has been illustrated and described by referring to some preferred embodiments of the present invention, a skilled person in the art should understand that various changes can be made in its form and detail without departing from the spirit or scope of the present invention defined in the appended claims.

What is claimed is:

1. A method for providing a subscriber of an Internet Protocol (IP) Multimedia Subsystem (IMS) with an intelligent service, wherein, the IMS comprises an IP Multimedia Service Switching Function (IM-SSF) entity supporting an intelligent control protocol other than a Customized Application for Mobile network Enhanced Logic (CAMEL) Application Part (CAP) protocol, the method comprises:
   selecting, by the IM-SSF, an intelligent control protocol upon receiving a session establish request related to the subscriber;
   triggering, by the IM-SSF the intelligent service to a Service Control Function (SCF) entity of a corresponding intelligent platform through the selected intelligent control protocol when the selected intelligent control protocol is an intelligent control protocol other than the CAP protocol,
   wherein the manner for selecting an intelligent control protocol is one of the following:
   Manner A: selecting an intelligent control protocol according to an extended CAMEL Subscription Information (CSI) type, which is defined as dedicated to a SCF supporting the intelligent control protocol other than the CAP protocol, by performing a matching evaluation of the extended CSI type at a Detection Point (DP);
   Manner B: selecting an intelligent control protocol according to a service key in a standard CSI associated with a match relationship between the service key and an intelligent control protocol configured in the IM-SSF in advance;
   Manner C: selecting an intelligent control protocol according to a SCF address in a standard CSI associated with a match relationship between the SCF address and an intelligent control protocol configured in the IM-SSF in advance; or
   Manner D: selecting an intelligent control protocol according to the settings in the IM-SSF that only one protocol is supported in a period of time.

2. The method according to claim 1, wherein the method further comprises: the IM-SSF obtaining the CSI of the subscriber, and the CSI is pre-configured in the IM-SSF, or downloaded from a Home Subscriber Server (HSS) of the subscriber by the IM-SSF when the subscriber registers or upon receiving the session establish request related to the subscriber.

3. The method according to claim 1, wherein, the support of the IM-SSF to the intelligent control protocol other than the CAP protocol comprises:
   the IM-SSF directly mapping a Session Initiation Protocol (SIP) to a Detection Point (DP) defined in the intelligent control protocol other than the CAP protocol, supporting the interface to the SCF of corresponding intelligent platform, and accomplishing service control over the SIP session under the control of the SCF;
   or, the support of the IM-SSF to the intelligent control protocol other than the CAP protocol comprises:
   the IM-SSF mapping the SIP to the DP defined in the CAP, supporting the CAP interface to a mobile SCF, implementing the mapping between the CAP interface and an interface of the intelligent control protocol other than the CAP protocol through a signaling conversion gateway, and accomplishing the service control over the SIP session through the signaling conversion gateway under the control of the SCF of the corresponding intelligent platform.

4. The method according to claim 3, wherein, the IM-SSF supporting the intelligent control protocol other than the CAP protocol is an independent entity.

5. The method according to claim 4, further comprising:
   before the IM-SSF triggers the intelligent service to the SCF of corresponding intelligent platform through the intelligent control protocol other than the CAP protocol, when receiving the session establish request related to the subscriber, a Serving-Call Session Control Function (S-CSCF) running an initial Filter Criteria (iFC) evaluation, and deciding, according to the result of the evaluation, whether to trigger the services to the IM-SSF, or to another IM-SSF supporting the CAP protocol.

6. The method according to claim 4, further comprising:
   before the IM-SSF triggers the intelligent service to the SCF of corresponding intelligent platform through the intelligent control protocol other than the CAP protocol, when receiving the session establish request related to the subscriber, a S-CSCF respectively triggering the service to the IM-SSF and another IM-SSF supporting the CAP protocol.

7. The method according to claim 3, wherein,
   the IM-SSF supporting the intelligent control protocol other than the CAP protocol is achieved by adding the functionality for supporting the intelligent control protocol other than the CAP protocol into the original IM-SSF supporting the CAP protocol in the IMS;
   before the IM-SSF triggers the intelligent service to the SCF of the corresponding intelligent platform through the intelligent control protocol other than the CAP protocol, the method further comprises:
   the IM-SSF selecting a protocol from the protocols comprising the CAP protocol and the intelligent control protocol other than the CAP protocol, and triggering the intelligent service to the SCF of corresponding intelligent platform if an intelligent control protocol other than the CAP protocol is selected.

8. The method according to claim 1, wherein the extended CSI type comprises at least one of:
   an Internet Protocol Multimedia Subsystem (IMS) Intelligent Network Application Protocol (INAP) Session Originating CSI, an IMS INAP Dialed Service CSI, and an IMS INAP Visited Mobile Switch Center (VMSC) Terminating CSI.

9. The method according to claim 1, wherein, the extended CSI type comprises at least one of: an IMS American National Standard Institute-41 (ANSI-41) Originating CSI, an IMS ANSI-41 Dialed Service CSI, and an IMS ANSI VMSC Terminating CSI.

10. The method according to claim 1, wherein a DP used for evaluating the CSI type comprises at least one of: a DP collected_information, a DP analysed_information, a DP Route_Select_Failure, a DP Terminating_Attempt, a DP Terminating_Busy (DP T_Busy), and a DP Terminating_No_Answer (DP T_No_Answer).

11. The method according to claim 1, wherein the IM-SSF supports a Call Party Handling (CPH) capability defined in the CAP protocol and other intelligent control protocols, and maps the intelligent service control process belonging to the CPH capability to corresponding SIP session control process.

12. The method according to claim 1, wherein the intelligent control protocol other than the CAP protocol comprises at least one of:

the INAP applied in the intelligent platform of the fixed IN, the ANSI-41 MAP protocol applied in the intelligent platform of the ANSI-41 WIN, and the CoreINAP defined by adding various extensions based on the INAP.

13. A system for providing a subscriber with an intelligent service, comprising:

a home Internet Protocol (IP) Multimedia Subsystem (IMS) of the subscriber and an intelligent platform adopting an intelligent control protocol other than a Customized Application for Mobile network Enhanced Logic (CAMEL) Application Part (CAP) protocol, wherein, the IMS comprises at least an IP Multimedia Service Switching Function (IM-SSF) entity supporting the intelligent control protocol other than the CAP protocol;

wherein the IM-SSF is capable of selecting an intelligent control protocol upon receiving a session establish request related to the subscriber, and triggering the intelligent service to a Service Control Function (SCF) of a corresponding intelligent platform through the selected intelligent control protocol when the selected intelligent control protocol is an intelligent control protocol other than the CAP protocol; and selecting an intelligent control protocol is performed by one of the following manners:

Manner A: selecting an intelligent control protocol according to an extended CAMEL Subscription Information (CSI) type, which is defined as dedicated to a SCF supporting the intelligent control protocol other than the CAP protocol, by performing a matching evaluation of the extended CSI type at a Detection Point (DP);

Manner B: selecting an intelligent control protocol according to a service key in a standard CSI associated with a match relationship between the service key and an intelligent control protocol configured in the IM-SSF in advance;

Manner C: selecting an intelligent control protocol according to a SCF address in a standard CST associated with a match relationship between the SCF address and an intelligent control protocol configured in the IM-SSF in advance; or Manner D: selecting an intelligent control protocol according to the settings in the IM-SSF that only one protocol is supported in a period of time.

14. The system according to claim 13, wherein, the CSI is pre-configured in the IM-SSF, or downloaded from a Home Subscriber Server (HSS) of the subscriber by the IM-SSF when the subscriber registers or upon receiving the session establish request related to the subscriber.

15. The system according to claim 13, wherein, the IM-SSF is used for directly mapping a Session Initiation Protocol (SIP) to a Detection Point (DP) defined in the intelligent control protocol other than the CAP protocol, and for supporting an interface to the SCF of corresponding intelligent platform in order to achieve the service control over the SIP session under the control of the SCF.

16. The system according to claim 13, further comprising: a signaling conversion gateway; wherein, the IM-SSF is used for mapping the SIP to the DP defined in a CAMEL criteria, supporting the CAP interface to a mobile SCF, and interacting with the SCF of corresponding intelligent platform through the signaling conversion gateway, thus achieving the service control over the SIP session under the control of the SCF of corresponding intelligent platform through the signaling conversion gateway;

the signaling conversion gateway, is used for implementing a bidirectional mapping between the CAP protocol and the intelligent control protocol other than the CAP protocol.

17. The system according to claim 13, wherein the IM-SSF supporting the intelligent control protocol other than the CAP protocol is an independent entity, or the IM-SSF is achieved by adding the functionality for supporting the intelligent control protocol other than the CAP protocol into the original IM-SSF supporting the CAP protocol in the IMS.

18. The system according to claim 13, wherein the intelligent control protocol other than the CAP protocol comprises at least one of:

an IN Application Protocol (INAP) applied in the intelligent platform of a fixed IN, an American National Standard Institite-41 (ANSI-41) Mobile Application Part (MAP) protocol applied in the intelligent platform of the ANSI-41 WIN, and a CoreINAP defined by adding various extensions based on the INAP.

19. The system according to claim 18, wherein, the DP defined in the intelligent control protocol other than the CAP protocol comprises one of: the DP defined in the INAP, and the DP defined in the ANSI-41 WIN criteria.

20. A method for providing a subscriber of an Internet Protocol (IP) Multimedia Subsystem (IMS) with an intelligent service, wherein, the IMS comprises an IP Multimedia Service Switching Function (IM-SSF) entity supporting an intelligent control protocol other than a Customized Application for Mobile network Enhanced Logic (CAMEL) Application Part (CAP) protocol, the method comprises:

selecting, by the IM-SSF, an intelligent control protocol upon receiving a session establish request related to the subscriber;

triggering, by the IM-SSF the intelligent service to a Service Control Function (SCF) entity of a corresponding intelligent platform through the selected intelligent control protocol when the selected intelligent control protocol is an intelligent control protocol other than the CAP protocol;

wherein, the support of the IM-SSF to the intelligent control protocol other than the CAP protocol comprises:

the IM-SSF directly mapping a Session Initiation Protocol (SIP) to a Detection Point (DP) defined in the intelligent control protocol other than the CAP protocol, supporting the interface to the SCF of corresponding intelligent platform, and accomplishing service control over the SIP session under the control of the SCF; or the IM-SSF mapping the SIP to the DP defined in the CAP, supporting the CAP interface to a mobile SCF, implementing the mapping between the CAP interface and an interface of the intelligent control protocol other than the CAP protocol through a signaling conversion gateway, and accomplishing the service control over the SIP session through the signaling conversion gateway under the control of the SCF of the corresponding intelligent platform;

and the IM-SSF supporting the intelligent control protocol other than the CAP protocol is achieved by adding the functionality for supporting the intelligent control protocol other than the CAP protocol into the original IM-SSF supporting the CAP protocol in the IMS;

before the IM-SSF triggers the intelligent service to the SCF of the corresponding intelligent platform through the intelligent control protocol other than the CAP protocol, the method further comprises: the IM-SSF selecting a protocol from the protocols comprising the CAP protocol and the intelligent control protocol other than the CAP protocol, and triggering the intelligent service to the SCF of corresponding intelligent platform if an intelligent control protocol other than the CAP protocol is selected;

the protocol selection from the protocols comprising the CAP protocol and the intelligent control protocol other than the CAP protocol is performed according to the settings in the IM-SSF that only one protocol is supported in a period of time.

21. A system for providing a subscriber with an intelligent service, comprising:
- a home Internet Protocol (IP) Multimedia Subsystem (IMS) of the subscriber and an intelligent platform adopting an intelligent control protocol other than a Customized Application for Mobile network Enhanced Logic (CAMEL) Application Part (CAP) protocol, wherein,
- the IMS comprises at least an IP Multimedia Service Switching Function (IM-SSF) entity supporting the intelligent control protocol other than the CAP protocol;
- wherein the IM-SSF is capable of selecting an intelligent control protocol upon receiving a session establish request related to the subscriber, and triggering the intelligent service to a Service Control Function (SCF) of a corresponding intelligent platform through the selected intelligent control protocol when the selected intelligent control protocol is an intelligent control protocol other than the CAP protocol; and
- the support of the IM-SSF to the intelligent control protocol other than the CAP protocol comprises:
  - the IM-SSF directly mapping a Session Initiation Protocol (SIP) to a Detection Point (DP) defined in the intelligent control protocol other than the CAP protocol, supporting the interface to the SCF of corresponding intelligent platform, and accomplishing service control over the SIP session under the control of the SCF; or
  - the IM-SSF mapping the SIP to the DP defined in the CAP, supporting the CAP interface to a mobile SCF, implementing the mapping between the CAP interface and an interface of the intelligent control protocol other than the CAP protocol through a signaling conversion gateway, and accomplishing the service control over the SIP session through the signaling conversion gateway under the control of the SCF of the corresponding intelligent platform;
- and the IM-SSF supporting the intelligent control protocol other than the CAP protocol is achieved by adding the functionality for supporting the intelligent control protocol other than the CAP protocol into the original IM-SSF supporting the CAP protocol in the IMS;
- before the IM-SSF triggers the intelligent service to the SCF of the corresponding intelligent platform through the intelligent control protocol other than the CAP protocol, the method further comprises: the IM-SSF selecting a protocol from the protocols comprising the CAP protocol and the intelligent control protocol other than the CAP protocol, and triggering the intelligent service to the SCF of corresponding intelligent platform if an intelligent control protocol other than the CAP protocol is selected;
- the protocol selection from the protocols comprising the CAP protocol and the intelligent control protocol other than the CAP protocol is performed according to the settings in the IM-SSF that only one protocol is supported in a period of time.

* * * * *

UNITED STATES PATENT AND TRADEMARK OFFICE
CERTIFICATE OF CORRECTION

Page 1 of 1

PATENT NO. : 8,626,158 B2
APPLICATION NO. : 11/599038
DATED : January 7, 2014
INVENTOR(S) : Dongming Zhu It is certified that error appears in the above-identified patent and that said Letters Patent is hereby corrected as shown below:

Title Page 2, References Cited, under Other Publications, the following cited art should read:

"3rd Generation Partnership Project; Technical Specification Group Core Network; Customised Applications for Mobile Network Enhanced Logic (CAMEL, Phase 4 - Stage 2 (Release 6))", 3GPP TS 23.078, September 2004.

"3rd Generation Partnership Project; Technical Specification Group Core Network; Customised Applications for Mobile Network Enhanced Logic (CAMEL, Phase 4 - Stage 2 IM CN Interworking (Release 5))", 3GPP TS 23.278, September 2004."

In the Claims:

Column 17/Line 42 should read: "ing to a SCF address in a standard CSI associated with"

Column 18/Line 19 should read: "dard Institute-41 (ANSI-41) Mobile Application Part"

Signed and Sealed this
Fifteenth Day of April, 2014

Michelle K. Lee
*Deputy Director of the United States Patent and Trademark Office*